July 28, 1953 J. L. DEFFENBAUGH 2,647,025
WHEEL STRUCTURE
Original Filed Dec. 17, 1948 2 Sheets-Sheet 1

INVENTOR.
John L. Deffenbaugh
BY Charles M. Fryer
ATTORNEY.

July 28, 1953   J. L. DEFFENBAUGH   2,647,025
WHEEL STRUCTURE
Original Filed Dec. 17, 1948   2 Sheets-Sheet 2

INVENTOR.
John L. Deffenbaugh
BY Charles M. Fryer
ATTORNEY.

Patented July 28, 1953

2,647,025

UNITED STATES PATENT OFFICE 2,647,025

WHEEL STRUCTURE

John L. Deffenbaugh, Peoria, Ill., assignor to Caterpillar Tractor Co., Peoria, Ill., a corporation of California Original application December 17, 1948, Serial No. 65,760. Divided and this application April 28, 1950, Serial No. 158,640

3 Claims. (Cl. 308—187.1)

The present invention will have many applications but is especially useful for and will be disclosed herein as applied to a track roller of the type commonly employed on a track type tractor for supporting the main body of the tractor on the rail surface of the endless track mechanism.

In a track type tractor, the track rollers are subjected to extremely heavy duty in an environment of a particularly abrasive nature and are subjected to severe and frequent impact loads. As a result, they are subject to rapid wear and distortion requiring frequent replacement and repair. Under such operating conditions, a major portion of the wear is confined to the periphery of the rollers and it is therefore common practice to provide roller rims which may be replaced. However, in rollers used in the past, considerable difficulty has been encountered with the rims becoming loose and rotating on the hubs due to distortion and growth of the rim bore under the shock loads encountered. Another difficulty encountered in other types of rollers is that it is necessary practically to disassemble the complete roller to replace the rim or adjust the end play of the supporting bearings, thus permitting dirt or other foreign material to enter the bearings and bearing seals causing rapid failure upon subsequent use.

The object of this invention is to provide a roller construction which permits the roller rim to be removed from its supporting hub without disassembly of the other parts of the roller.

Another object of this invention is to provide means to support the bearings within the roller hub in a manner to permit adjustment of bearing end play without removing the roller from its supporting frame.

Other objects and advantages of this invention will be made apparent in the following specification wherein reference is made to the accompanying drawings.

Figure 1:
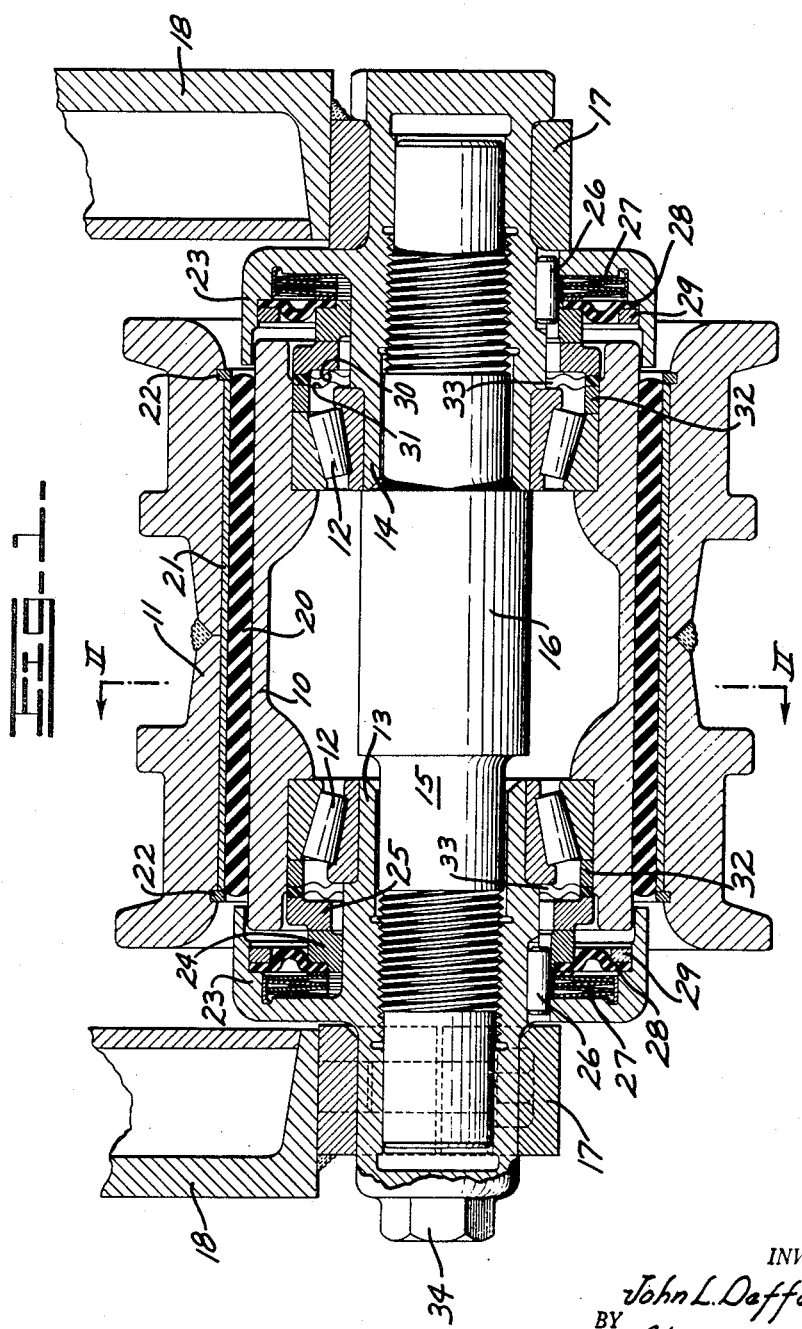
Fig. 1 is a central longitudinal sectional view through a track roller embodying the present invention.

In Fig. 1, a track roller embodying the present invention is illustrated as comprising a hollow hub 10 having a removable outer rim 11 which is adapted to engage the rail surfaces of an endless track mechanism (not shown). The hub is supported for rotation on a pair of spaced tapered roller bearings 12, the inner races of which are carried on end caps 13 and 14. Each of the end caps is provided with a threaded connection with the ends of a non-rotating shaft 15 extending through the bore of the hub and provided with a central portion 16 of increased diameter. The end caps are supported by means of clamps 17 from spaced frame members 18 forming a part of the roller truck frame.

Figure 2:
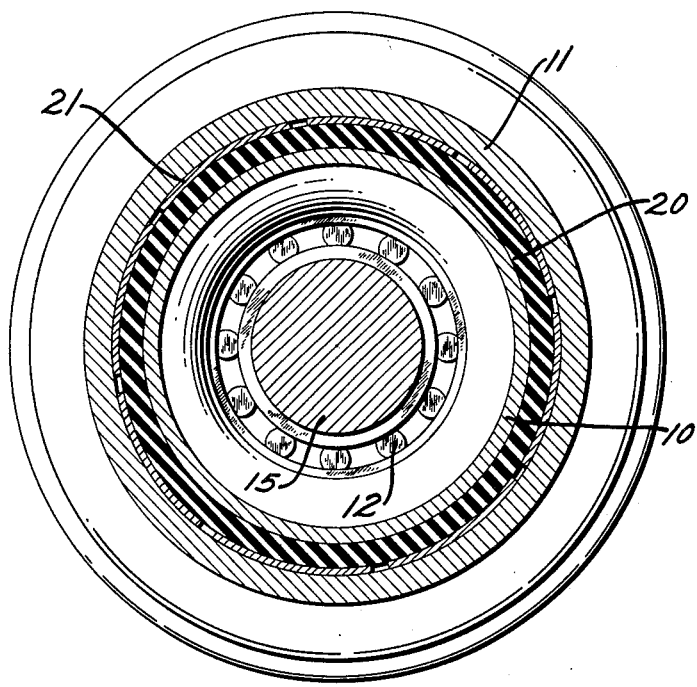
Fig. 2 is a sectional view taken along the line II—II of Fig. 1.

As is also illustrated in Fig. 2, the rim 11 is separated from the hub 10 by means of a resilient sleeve 20 of rubber or other suitable material to dampen the shock loads encountered by the rim before transmitting them to the bearings. The sleeve 20 is encased in a plurality of closely spaced semi-cylindrical metal sections forming an outer expansible substantially cylindrical sleeve 21 which is adapted to engage the bore of the roller rim. As the roller rim is pressed over the hub and resilient sleeve, the presence of a metal outer sleeve permits easier installation and removal by virtue of the lesser resistance to sliding movement of metal against metal than that of rubber against metal. The sectional parts of the sleeve 21 are preferably secured to the resilient sleeve 20 as by any conventional bonding method. In its free state, the diameter of the resilient sleeve 20 is greater than the bore of the rim so that when assembled, the sleeve is in compression. During distortion and growth of the rim bore, the resilient material expands providing good frictional contact between the outer sleeve 21 and the bore of the rim preventing relative rotation. Relative axial movement is prevented by a pair of split lock rings illustrated at 22 in Fig. 1.

Each of the end caps 13 and 14 is provided with an outwardly projecting cup-like flange 23 forming an annular recess for the reception of a pair of face type sealing members 24 and 25. The member 24 is carried on the end cap and is prevented from rotation thereon by means of a pin 26. A stack of Belleville type springs 27 is interposed between the flange 23 and member 24 urging it into sealing engagement with the sealing member 25 thus preventing foreign material from entering the bore of the hub and damaging the bearing. A resilient cover 28 interposed between the spring nest and sealing member 24 is provided to prevent water and dirt from surrounding the springs preventing their free action. At its outer periphery, the cover 28 is pressed into sealing engagement with the flange 23 by means of a retainer ring 29.

Figure 3:
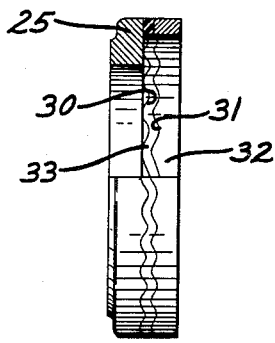
Fig. 3 is a fragmentary sectional view of the driving mechanism for the rotating half of a bearing seal shown in Fig. 1.

The sealing member 25 is carried in the bore of the roller hub 10 and is provided with an irregular face 30 adapted to engage a complementary face 31 provided on a driving ring 32 pressed into the bore of the hub. As is also illustrated in Fig. 3, a resilient gasket 33 is interposed between the complementary irregular faces preventing the entrance of foreign material between them as well as providing a resilient drive between the driving ring and the seal member. The driving connection automatically centers the sealing member 25 with respect to the driving ring which in combination with the resilient action of the gasket 31 insures good sealing contact between the sealing faces of the members 24 and 25.

The diameter of the flange 23 is less than the inside diameter of the rim 11 permitting the rim to be removed from the hub without disassembling the bearings or bearing seals thus simplifying this operation. The inner diameter of the sealing ring 25 is less than the largest diameter of the inner race of the bearing 12 to insure that the inner race of the bearing, the seal members, and the end cap will be removed from the shaft as a unit. Upon removal of either of the end caps, the springs 27 urge both of the sealing members away from the flange 23 until the sealing member 25 engages the inner race of the bearing 12 thus continuously maintaining the sealing members in sealing contact. By virtue of this arrangement, abrasive particles which would cause serious damage to the sealing faces are prevented from lodging between the sealing faces during the time that the roller is disassembled.

As the inner races of the bearings 12 are carried on the end caps 13 and 14, the end play of the bearings may be adjusted by rotation of either cap relative to the shaft 15. At assembly, the end cap 14 is threaded on the shaft 15 until the inner face of the cap abuts the shoulder of the raised portion 16 preventing further relative movement. The end clearance or play of the bearing is then adjusted by rotation of the cap 13 which is provided with a projection 34 for the reception of a wrench. In service, this adjustment can be made without removing the roller from the truck frame by loosening the clamp 17 permitting adjustment of the end cap 13.

I claim:

1. In a wheel structure which includes a hub supported for rotation on spaced bearings, a removable bearing supporting member for each bearing, a sealing assembly on each bearing supporting member to prevent entry of foreign matter to the bearings, and means including a part of the bearing engageable by a part of the seal to prevent breaking of the seal formed by the sealing assembly upon its removal from the wheel structure.

2. In a wheel structure with spaced antifriction bearings, a hub carrying spaced outer bearing races, a shaft, end assemblies on the shaft, each end assembly carrying an inner bearing race for cooperation with one of said outer bearing races, a seal device carried by each end assembly to prevent entry of foreign matter to the bearings, said end assembly being removable, and means acting upon its removal to hold the parts of the seal device in sealing contact.

3. In a wheel structure with spaced antifriction bearings, a hub carrying spaced outer bearing races, a shaft, end assemblies on the shaft, each end assembly carrying an inner bearing race for cooperation with one of said outer bearing races, a seal device with resilient pressure carried by each end assembly to prevent entry of foreign matter to the bearings, said end assembly being removable, and a part on the seal device separable from the hub and engaged by the inner bearing race to retain the seal parts in sealing relationship while the end assembly is removed.

JOHN L. DEFFENBAUGH.

References Cited in the file of this patent

FOREIGN PATENTS

| Number | Country | Date |
| --- | --- | --- |
| 137,163 | Great Britain | Jan. 8, 1920 |
| 850,445 | France | Dec. 16, 1939 |